(12) United States Patent
Grossman et al.

(10) Patent No.: US 9,760,518 B2
(45) Date of Patent: Sep. 12, 2017

(54) MULTIMEDIA SWITCH BOX

(71) Applicant: HARMAN BECKER AUTOMOTIVE SYSTEMS GmbH, Karlsbad (DE)

(72) Inventors: Volker Grossman, Straubenhardt (DE); Jens Oertel, Bad Bergzabern (DE); Thomas Degueldre, Karlsruhe (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 300 days.

(21) Appl. No.: 14/599,092

(22) Filed: Jan. 16, 2015

(65) Prior Publication Data
US 2015/0205744 A1 Jul. 23, 2015

(30) Foreign Application Priority Data
Jan. 22, 2014 (EP) .................................. 14152151

(51) Int. Cl.
*G06F 13/00* (2006.01)
*G06F 9/445* (2006.01)
*G06F 13/40* (2006.01)

(52) U.S. Cl.
CPC ............ *G06F 13/4022* (2013.01); *G06F 8/65* (2013.01); *G06F 2213/0042* (2013.01)

(58) Field of Classification Search
None
See application file for complete search history.

(56) References Cited

U.S. PATENT DOCUMENTS 8,209,678 B2 * 6/2012 Sadja ........................ G06F 8/65
717/172

2005/0097541 A1 * 5/2005 Holland ..................... G06F 8/65
717/168
2011/0141232 A1 6/2011 Tsukagoshi
2013/0318513 A1 * 11/2013 Chu .......................... G06F 8/665
717/168
2015/0089092 A1 * 3/2015 Voto ...................... G06F 13/385
710/14
2015/0100633 A1 * 4/2015 Barrett ..................... B62J 99/00
709/204

FOREIGN PATENT DOCUMENTS

FR 2990092 A1 11/2013
WO 2006108174 A2 10/2006
WO 2013009334 A1 1/2013

OTHER PUBLICATIONS

International Search Report for Application No. 14 15 2151, dated Mar. 26, 2014.

* cited by examiner

*Primary Examiner* — David E Martinez
(74) *Attorney, Agent, or Firm* — Artegis Law Group, LLP

(57) ABSTRACT

The present invention relates to a multimedia switch box device comprising a processing means; an interface and a plurality of universal serial bus, USB, connections. The processing means is configured to initiate download of software via the interface to an USB memory device connected to a first one of the plurality of USB connections, establish data connection between the USB memory device and a device connected to a second one of the plurality of USB connections after download of the software, and initiate download of the software from the USB memory device to the device connected to the second one of the plurality of USB connections.

15 Claims, 5 Drawing Sheets

MULTIMEDIA SWITCH BOX

FIELD OF INVENTION

The present invention relates to multimedia switch box and, in particular, to a multimedia switch box for testing a device under test, for example, a device under test being part of an infotainment system.

BACKGROUND OF THE INVENTION

Multimedia switch boxes are used for connecting different media devices to one or more operation devices using media information stored on the media devices. Examples for media device include data archives, DVDs, CDs, etc. Examples for operation devices include TVs, music players, navigation systems, etc. Nowadays vehicles, in particular, automobiles are usually equipped with infotainment systems. An infotainment system may comprise or consist of a telematic system generally including one or more of an automotive navigation system using global positioning system technology, an emergency warning system for vehicles, both in vehicle-to-vehicle and in vehicle-to infrastructure settings, an emergency calling system in the case of accidents and breakdown of the vehicle, integrated hands-free cell phones, wireless safety communications, automatic driving assistance systems, mobile data, radio and television, and vehicle tracking.

An infotainment system comprises a plurality of operation devices that are individually to be tested during the complex process of development of the infotainment system. Connection between a controller or server as well as a media archive and a device under test can be facilitated by a multimedia switch box. A particular problem arises when some firmware/software update becomes available for a particular operation device for which operation is to be tested during development of the infotainment system. In the art, the update of the individual devices requires time consuming manual operation by the developer. Similarly, updating consumer devices, as receivers, for example, sat-receivers, requires time consuming operation by a customer.

Thus, it is an object of the present invention to provide for means for an accelerated and reliable firmware/software update of a device under test or some consumer device.

DESCRIPTION OF THE INVENTION

The above-mentioned object is addressed by a multimedia switch box device comprising a processing means, an interface that may comprise an Ethernet, USB, WLAN, WiFi or Bluetooth connection and a plurality of universal serial bus, USB, connections (for example 16 USB connections). The processing means (or control logic) is configured to initiate download of software via the interface to an USB memory device connected to a first one of the plurality of USB connections. Furthermore, the processing means is configured to (automatically) establish data connection between the USB memory device and a device (an electronic device) connected to a second one of the plurality of USB connections (different from the first one) after download of the software and (automatically) initiate download of the software from the USB memory device to the device connected to the second one of the plurality of USB connections.

The processing means (control logic) may automatically initiate the software download via the interface when it is detected. In particular, the processing means may be configured to automatically detect that new software is available for download via the interface. The idea behind this is that the device connected to the second one of the plurality of USB connections has to be updated by a new version of software or firmware (in the following the term software is used and it is understood that any firmware is covered by this term) that is detected and downloaded to the USB memory device, for example, a memory stick, and subsequently downloaded to the device connected to the second one of the plurality of USB connections after a data connection between this device and the USB memory device has been established. No (manual) operation by an operator or consumer is necessary for updating the device connected to the second one of the plurality of USB connections.

The (electronic) device connected to the second one of the plurality of USB connections can be a device under test of an (automotive) infotainment system or a consumer device, in particular, a receiver or sat-receiver. Thus, the inventive multimedia switch box device can be employed in the context of the development of an infotainment system (for details see description below). Alternatively, the device can be a consumer article, for example, some media player. Update of the media player (or other electronic device as, for example, a receiver or sat-receiver) by new software/firmware can be facilitated by the multimedia switch box device without the need for interaction of a consumer with the device apart from using the USB connections provided by the multimedia switch box device for connecting USB devices to the multimedia switch box device.

In all of the above-mentioned embodiments the processing means may particularly be configured to establish the data connection between the USB memory device and the device connected to the second one of the plurality of USB connections as a one-by-one connection, for example, by means of a programmable interface. The one-by-one connection is to be distinguished from a USB hub. Whereas the USB hub allows for connection a variety of USB devices to a target device, the one-by-one connection results from a selection of a connection of a particular individual USB memory device to the device connected to the second one of the plurality of USB connections only. The particular individual USB memory device has no data connection to any other USB device after establishing the one-by-one data connection to the USB memory device. In this context, it should be noted that the multimedia switch box device may be configured such that no properties of the devices connected to the USB connections of the multimedia switch box device are modified by the multimedia switch box device. In particular, the multimedia switch box device does not comprise an USB amplifier means and, thus, data connection between the particular individual USB memory device and the USB device is established by the multimedia switch box device as if the particular individual USB memory device and the USB device were directly connected to each other by a USB connection cable.

If the multimedia switch box device is used in the context of the development of an infotainment system (or another system comprising electronic devices) some predefined tests may be carried out after completion of the download of the new software to the device connected to the second one of the plurality of USB connections. In this case, the processing means of the multimedia switch box device may be further configured to automatically execute one or more tests of the device connected to the second one of the plurality of USB connections after download of the software to that device.

The multimedia switch box device may be part of some virtual test bench for performing tests of individual devices being part of the infotainment system. Particularly, the processing means may initiate running a test sequence for the device connected to the second one of the plurality of USB connections wherein other devices connected to other USB connections of the multimedia switch box device are involved. The other devices may comprise data archive or media processing devices, for example. The processing means may be configured to automatically initiate running the test sequence upon completion of the download of the new software (detected and obtained by the multimedia switch box device) to the device connected to the second one of the plurality of USB connections. Thus, the development of the infotainment system can be significantly accelerated as compared to the techniques known in the art.

Furthermore, it is provided a cascading multimedia switch box device comprising the multimedia switch box device of one of the above-described embodiments and, in addition, a multimedia switch box without a processing means and connected in data connection with that multimedia switch box device. The additional multimedia switch box comprises its own plurality of USB connections. For example, the cascading multimedia switch box device comprises three multimedia switch boxes each comprising 16 USB connections and no processing means wherein each of the three multimedia switch boxes is connected to the multimedia switch box device of one of the above-described embodiments. In particular, the cascading multimedia switch box device may represent a server-client architecture wherein the multimedia switch box device of one of the above-described embodiments represents the only server of the server-client architecture. These variants of a cascading multimedia switch box device allow for connecting a huge number of USB devices to be used during the development of an infotainment system, for example.

The above-mentioned problem is also addressed by a method of updating an electronic device, comprising the steps of connecting a universal serial bus, USB, memory device to a first USB connection of a multimedia switch box device;
connecting the electronic device to a second USB connection (different from the first one) of the multimedia switch box;
automatically downloading software to the USB memory device by the multimedia switch box device via an interface of the multimedia switch box device;
automatically establishing a data connection between the USB memory device and the electronic device by the multimedia switch box device; and
automatically downloading the software from the USB memory device to the electronic device by the multimedia switch box device.

The method may further comprise automatically detecting the software by the multimedia switch box device before downloading the same to the USB memory device. In addition, automatically establishing the data connection between the USB memory device connected to the first USB connection and the electronic device connected to the second USB connection may comprise establishing a one-by-one connection between the USB memory device and the electronic device without employing an USB hub. The electronic device may be a navigation system or part of it, tuner, DVD player, CD player, mobile phone connecting unit, hands-free unit all of which may be installed in a vehicle.

Furthermore, it is provided a program product, comprising one or more computer readable media having computer-executable instructions for performing the steps of embodiments of the inventive method of updating an electronic device as described above.

Additional features and advantages of the present invention will be described with reference to the drawings. In the description, reference is made to the accompanying figures that are meant to illustrate preferred embodiments of the invention. It is understood that such embodiments do not represent the full scope of the invention.

The present inventions provides a multimedia switch box device and a method for updating software on an electronic device by means of such a multimedia switch box device. The inventive multimedia switch box device and method are particularly suitable for facilitating the development of complex communication system, in particular, an automotive infotainment system. In the following, an infotainment system is described for illustrative purposes.

The infotainment system may be partly installed in any kind of vehicle, particularly, an automobile. The infotainment system may comprise or consist of an automotive telematic system including an automotive navigation system, and integrated hands-free cell phone, wireless safety communications, Internet access device, radio and television. Personalized telematic services may be provided wherein personal preferences and/or requirements of an individual user with respect to the provided telematic service are taken into account by the automotive telematic system. Typical examples are favorite selections in terms of radio stations, TV programs, or websites, user defined or selected destinations for navigation systems or user defined seat and mirror arrangements.

Other examples may be graphics or display settings for navigation and/or infotainment displays or access to personal telephone directories. Some telematic services may require user authentication, in particular, if they are provided by an external provider via the automotive telematic system. Specific, but not limiting examples for such telematic services are video downloads and streams, TV broadcasts, satellite radio broadcasts or access to specific websites, which are liable to pay costs. In addition, telematic services may be provided to specific users only, for example, an owner of a car, due to their sensitive or safety related nature. As an example for such a service, establishing a connection between the automotive telematic system and a remote server of a car retailer or mechanics, for instance for diagnostic purposes, may be cited. Furthermore, personal user data may be stored on the automotive telematic system, access to which a user may want to restrict.

Figure 1:
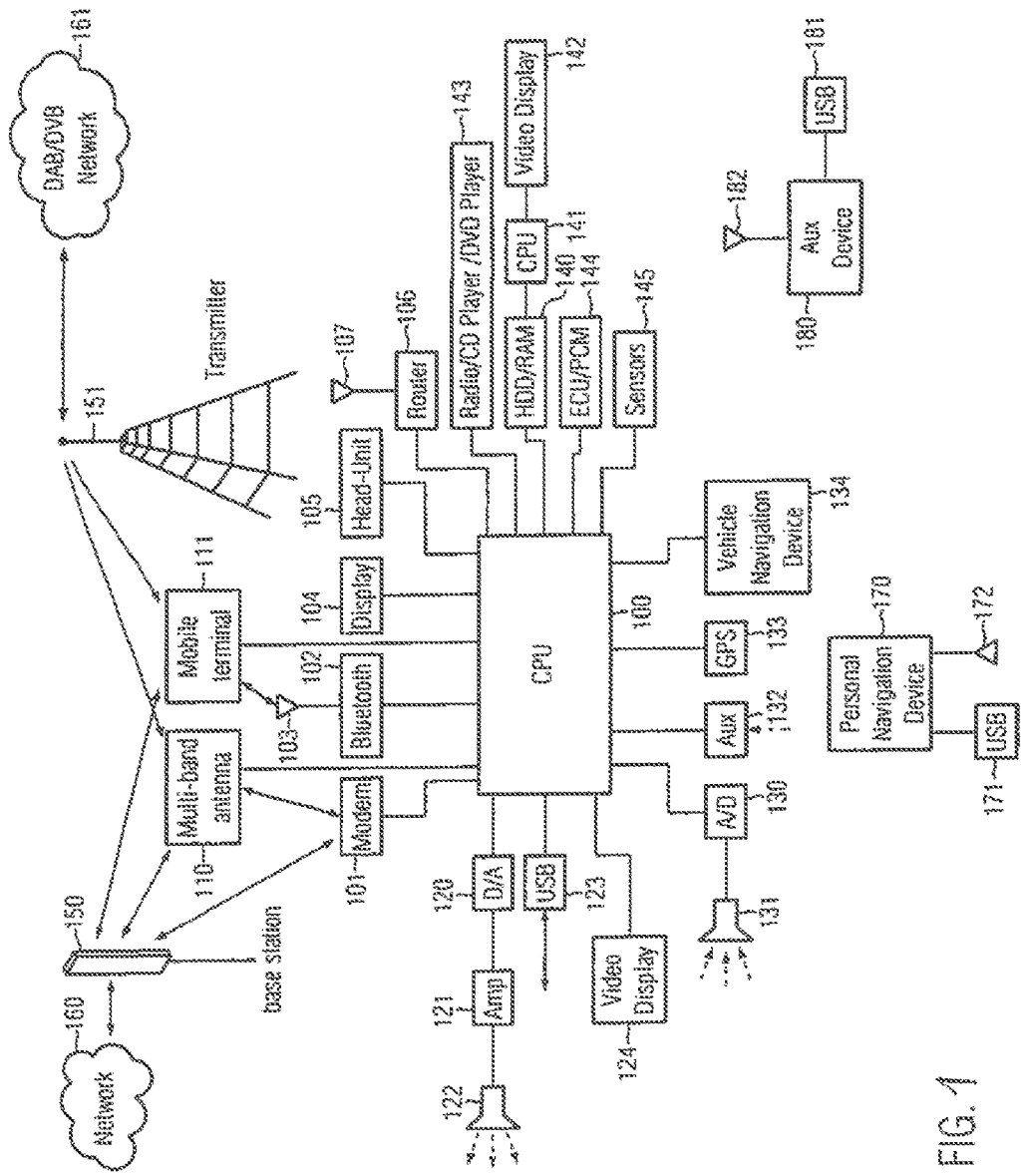
FIG. 1 illustrates an infotainment system installed in a vehicle the development of which can be facilitated according to the present invention.

FIG. 1 illustrates components 100 to 145 and 170 to 182 that are installed in a vehicle, while components 150 to 161 are external components which are not part of the shown example of an automotive telematic system but may interact with some of the telematic components of the vehicle.

A vehicle equipped with a telematic system may contain a display 104, as a visual front end interface located in the vehicle. The user may also be able to interact with the interface via a touch sensitive screen, via pressing a button, via audible speech and speech synthesis, or other HMI (Human-Machine-Interaction) components known in the art. Interaction via audible speech and speech synthesis or analysis may be via a microphone 131 and an A/D converter 130 for receiving input from the user and via a D/A converter 120, an amplifier 121, and one or several speakers 122 for giving output to the user. The visual front end interface may be part of a head-unit for a centralized interaction of the user with the telematic system or separate from one or more dedicated head-units 105, for example, for interaction of the user with audio or telephony components of the telematic system.

A central processing unit 100, typically a CPU or GPU of an embedded system, controls at least a portion of the operation of the telematic system. A CPU 141 provided with a video display 142, possibly as part of a rear seat entertainment system for displaying movies from a storage device, like a hard disk drive 140, is also provided. The processing unit allows on-board processing of instructions, commands, and routines, particularly as part of an application component of the telematic system. The processing unit 100 may further be connected to both non-persistent and persistent storage devices 140. The non-persistent storage device can be a random access memory (RAM) and the persistent storage device can be a hard disk drive (HDD) or flash memory.

The processing unit 100 may also be provided with a number of different inputs allowing the user to interface with the processing unit. A microphone 131, an auxiliary input 132, a USB input 123, a GPS input 133, and a Bluetooth input 102 are all provided. An input selector may be provided to allow the user to swap between various inputs. Input to the microphone 131 is converted from analog to digital by an A/D converter 130 before being passed to the processing unit.

Outputs from the telematic system may include, but are not limited to, a video display 124 and a speaker 122 or stereo/surround system output. The speaker may be connected to an amplifier 121 and may receive its signal from the processing unit 100 through a digital-to-analog converter 120. Output can also be made via the Bluetooth transceiver 102 with a Bluetooth antenna 103 to a remote Bluetooth device such as a personal navigation device 170 or mobile communication device with a Bluetooth antenna 172. Communication with a personal navigation device can also be achieved via USB connectors 123 and 171. The telematic system may further comprise a vehicle navigation device 134, which may interact with the GPS unit 133 and/or a mobile network 160 via a base station 150 and a multi-band antenna 110 or a mobile terminal (mobile communication device) 111. The mobile terminal 111 may particularly be a cell phone, smart phone, PDA, or the like and may be connected to the processing unit 100 either directly, via a USB connector 123, or via the Bluetooth transceiver 102 with its antenna 103. The multi-band antenna 110 may exchange data with the processing unit 100 either through a wire or wirelessly through a modem 101. Here, the base station 150 and the network 160 are not part of the telematic system but provided outside the vehicle. Particularly, the base station 150 may be a WiFi access point.

Data may be communicated between the central processing unit 100 and the network 160 utilizing, for instance, a data-plan, data over voice, or DTMF tones associated with the mobile terminal. Both multi-band antenna 110 and the mobile terminal 111 may exchange data bi-directionally with the base station or WiFi access point 150. The modem 101 may also communicate directly with a network 160 through communications with a cellular tower 150. The modem 101 may be a USB cellular modem and the communication may be cellular communication.

The processing unit 100 is provided with an operating system including an API to communicate with a modem application software. The modem application software may access an embedded module or firmware on the Bluetooth transceiver 102 to complete wireless communication with a remote Bluetooth transceiver (such as that of the mobile terminal 111). The mobile terminal 111 may include a modem for voice band or broadband data communication. If the user has a data-plan associated with the mobile terminal 111, it is possible that the data-plan allows for broadband transmission and the telematic system could use a much wider bandwidth (speeding up data transfer).

The mobile terminal 111 may be replaced with a cellular communication device (for example, and without limitation, a modem 101), that is installed in the vehicle. The mobile terminal 111 may be replaced with a wireless local area network (LAN) device capable of communication over, for example, an 802.11g network (i.e., WiFi) or a WiMax network. Incoming data can be passed through the mobile terminal 111 via a data-over-voice or data-plan, through the on-board Bluetooth transceiver 102 and into the central processing unit 100.

Data, whether incoming or outgoing or temporary, may be stored on the HDD 140 or in the RAM 140 or any other storage media until such time as the data is no longer needed. The HDD 140 or other storage media may in particular be used as the memory for storing individual user data or data downloaded from an external provider. The communication with a remote server of an external provider may be performed via the modem 101, the multi-band antenna 110, the Bluetooth transceiver 102, or the mobile terminal 111, for example, via a mobile network 160 or a wireless network.

The central processing unit may further be in communication with a variety of other auxiliary devices 180, like a mobile communication device of a user. These devices can be connected through wireless 182 or wired 181 connections (such as a USB connection). Also, or alternatively, the CPU 100 may be connected to a vehicle based wireless router 106, using for example a WiFi transceiver 107. This could allow the CPU to connect to remote networks in range of the local router 106.

The processing unit 100 may further interact with a radio, a CD player, or a DVD player 143 to provide audio and/or video to the stereo system 122 and/or a video display 142. Audio and/or video may also be provided via the multi-band antenna 110 or the mobile terminal 111 from a mobile network 160, wireless network, or digital broadcast network 161 (Digital Audio Broadcast, Digital Video Broadcast) via a broadcast transmitter 151 outside the vehicle. Audio and video data may be downloaded or streamed through the above described connections. In the case of a download, the data may be temporarily or persistently stored in the HDD 140 or other storage device. A further processing unit 141 may later read the stored data from the HDD 140 and provide video and/or audio services through the vehicle's speaker system 122 or a video display 142.

The processing unit 100 may further interact with a microphone 131 and the vehicle's speaker system 122 to provide hands-free telephony, for example, via the mobile terminal 111. Similarly the processing unit 100 may interact with the mobile terminal 111 and vehicle diagnostics (not shown) to send an emergency call or a breakdown call.

The processing unit 100 may also interact with an engine control unit (ECU) 144 to control engine parameters or monitor the vehicle's engine. Similarly, the processing unit 100 may interact with a powertrain control module (PCM) 144 and a series of sensor systems 145, like for instance but without limitation, a tire pressure monitoring system, a road condition sensor, a parking sensor, a temperature sensor, an ambient light sensor, and the like. Wired communications within the automotive telematic system may be carried out using MOST (Media Oriented Systems Transport), CAN (Controller Area Network), IEEE 1394, or other technologies known in the art.

Some of the infotainment (telematic) services which may be provided by the automotive telematic system are described in the following.

An application component may provide hands-free telephony in interaction with a microphone 131 and A/D converter 130 and the vehicle's stereo system, comprising speakers 122, an amplifier 121, and D/A converter 120, as well as a mobile terminal 111. The provided telematic service may involve further application components, like for instance a speech recognition component or application components controlling a volume of the radio and/or display devices.

A further application component may provide on-board navigation services in interaction with the GPS unit 133, the vehicle navigation device 134 or a personal navigation device 170, as well as the modem 101 and the multi-band antenna 110.

Further application components may provide audio services, such as AM/FM radio reception, In-Band On-Channel (IBOC) radio reception, or digital audio broadcast radio, and/or video services such as DVD/CD playback, HDD playback, digital video broadcast services, video-on-demand services, pay-per-view services, or video downloads/streams from the internet. Depending on the service, the mobile terminal 111 or the multi-band antenna 110 may receive data from a base station 150 or a broadcast transmitter 151. The playback of a video stored on a HDD 140 may also involve a further processing unit 141 and a further (rear) video display 142, wherein the further processing unit 141 handles most of the processing required for displaying a movie, while the application component on the central processing unit 100 only monitors the success of the service, or the further processing unit 141 may even implement the application component itself.

As a further telematic service, an application component may provide web access, for example, for video downloads or streams, and/or email access, for example, in interaction with the modem 101 and the multi-band antenna 110, the wireless router 106, or the mobile terminal 111. Through the mobile terminal 111 and/or the multi-band antenna 110, a further application may receive traffic information from a network 160, and propose a different route in interaction with a vehicle navigation device 134 and the GPS unit 133.

Finally, an application component may provide telematic services relying on HMI (Human-Machine Interaction) like a touch sensitive screen, a mouse, a control stick, or trackball to play (online) games for instance, or browse through the monitoring system of the vehicle, to interact with the vehicle navigation device 134 or to operate a media station of the vehicle.

From the above, it becomes obvious that the development of an infotainment system represents a demanding task for the developer. Complex interactions of various components have to be considered and thoroughly tested. The present invention, particularly, provides means for facilitating the development and testing of (elements of) an infotainment system as the one described above, for example.

Figure 2:
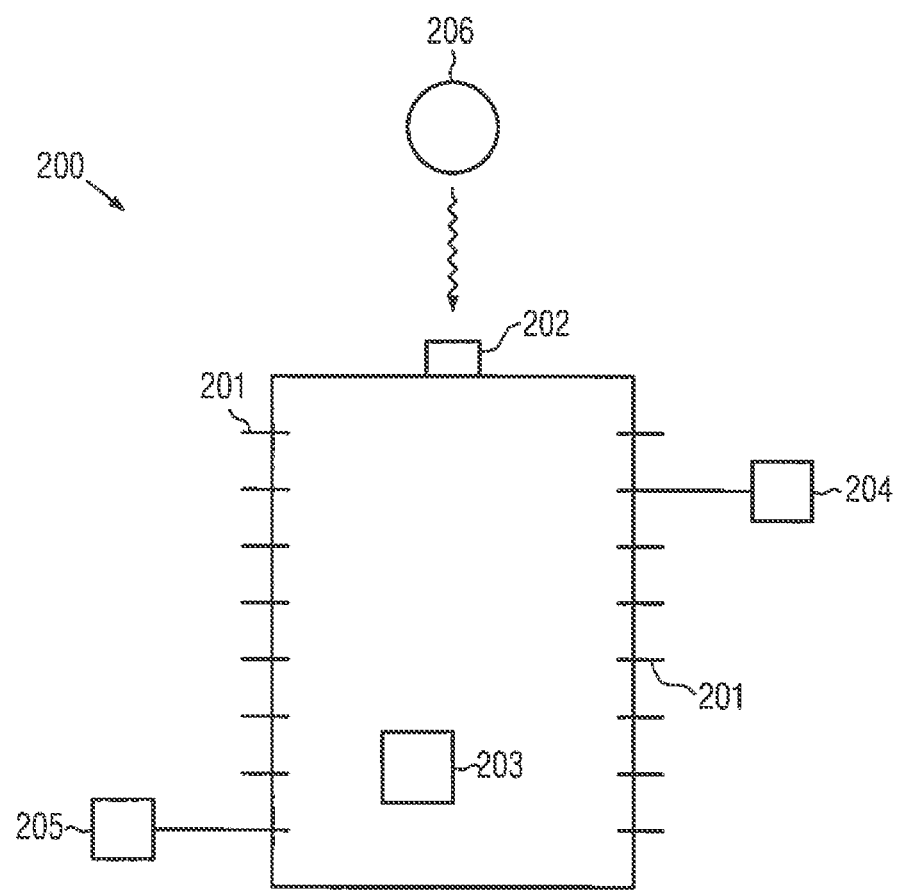
FIG. 2 shows an example of the inventive multimedia switch box device comprising a processing means and USB connections.

FIG. 2 illustrates a multimedia switch box device 200 according to an example of the present invention. The multimedia switch box device 200 comprises a plurality of USB connections (connectors) 201, for example, 16 USB connections 201. It is noted that the USB connections 201 may comprise USB 2.0 and/or USB 3.0 serial A and/or serial B female connectors. Moreover, the multimedia switch box device 200 comprises an interface 202 and a processing means 203. The interface 202 may comprise an Ethernet, USB, WLAN, WiFi or Bluetooth connection. The processing means 203 may comprise a conventional CPU or single-board computer. Furthermore, the processing means 203 may comprise or have access to a ROM and RAM. At a first one of the plurality of USB connections 201 a USB data storage device 204 is connected. The USB data storage device 204 may be a USB memory stick. At a second one of the plurality of USB connections 201 a device under test 205 in form of one of the components of an infotainment system as illustrated in FIG. 1 is connected.

According to an example, the processing means 203 is configured to detect some software or firmware update 206 suitable for the device under test 205 via the interface 202. Upon detection of the new software/firmware it may download it via the interface 202 to the USB data storage device 204. When the processing means 203 detects connection of the device under test 205 to a USB connection 201 of the multimedia switch box device 200 it initiates updating the device under test 205 by the new software/firmware by downloading it from the USB data storage device 204 to the device under test 205. Detection of the new software/firmware 206 that might become available from some data archive or remote server and downloading it to the USB data storage device 204 and, subsequently, to the device under test 205 might be carried out fully automatically. Download of the new software/firmware 206 from the USB data storage device 204 to the device under test 205 can be automatically initiated by the device under test 205. In particular, the processing means 203 is configured to establish a one-by-one data connection between the device under test 205 and the USB data storage device 204 after the new software/firmware has been stored on the USB data storage device 204.

The one-by-one data connection is an exclusive connection between the device under test 205 and the USB data storage device 204. No other data connection between the device under test 205 and any other USB device apart from the USB data storage device 204 is established by the processing means 203. This feature is in sharp contrast to the operation of a USB hub. After software update on the device under test 205 new data connections between the device under test 205 and any other USB devices connected to the multimedia switch box device 200 may be established according particular applications defined by a user/developer.

The multimedia switch box device 200 shown in FIG. 2 may be further equipped with a remote control interface for controlling operation of the multimedia switch box device 200 by user/developer. Alternatively or additionally manual operation keys may be comprised in the multimedia switch box device 200. A user/developer may realize a variety of data connections between different USB devices connected to the multimedia switch box device 200 by the USB connections 201.

Figure 3:
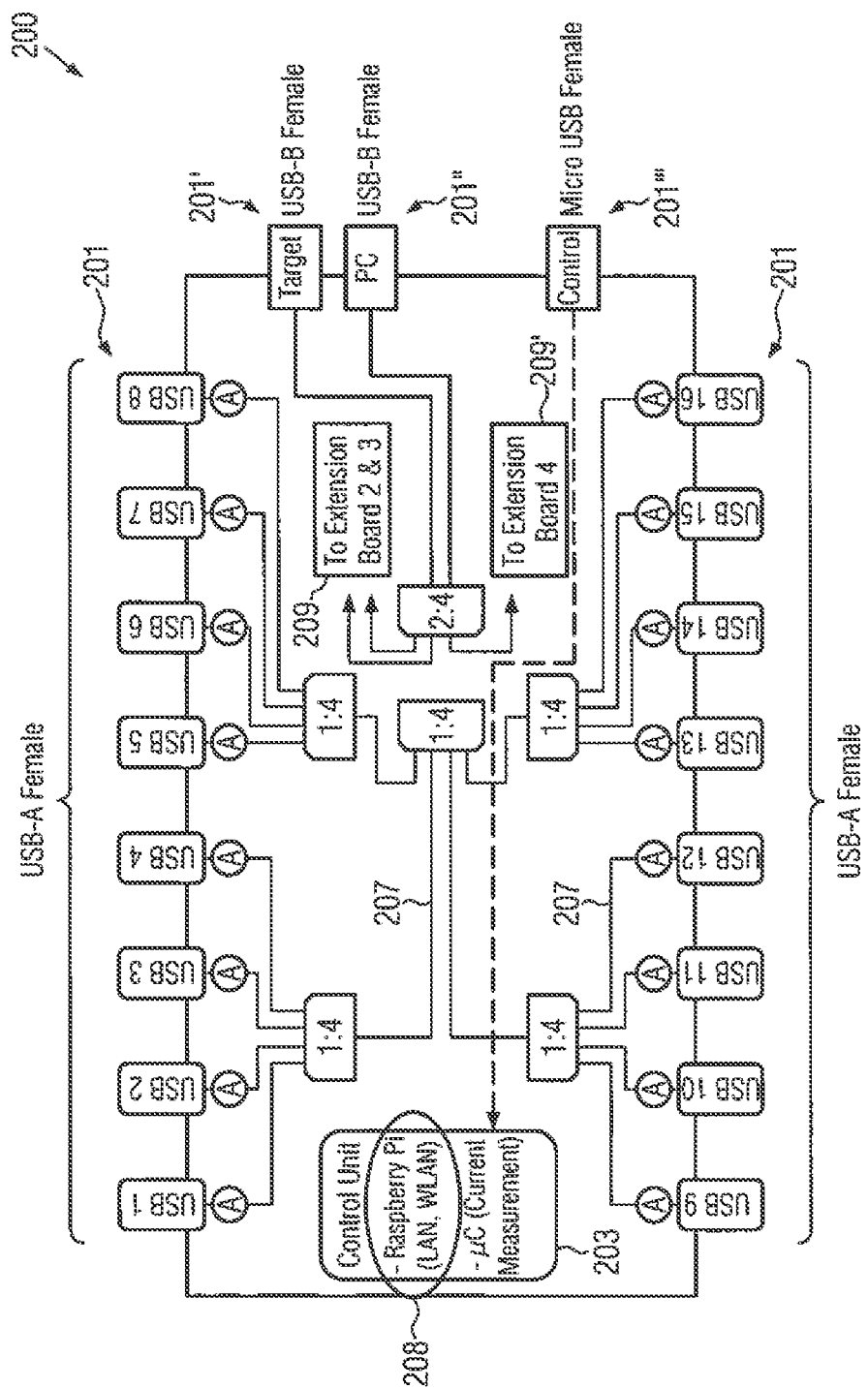
FIG. 3 shows further details of a multimedia switch box device according to an example of the present invention.

Further details of a multimedia switch box device, for example, the multimedia switch box device 200 of FIG. 2, are shown in the top view of FIG. 3. The multimedia switch box device 200 shown in FIG. 3 comprises 16 female USB-A connections 201. An additional female USB-B connection 201' is provided for connecting an electronic device, for example, a device under test. Another female USB-B connection 201" is provided for connecting a PC. Additionally, in the example shown in FIG. 3 an interface, for example, comprising a Micro USB Female connection 201''' is provided for allowing data connection with an external control device. Data connection between the USB connections 201, 201', 201" and 202''' is provided by data buses 207.

The multimedia switch box device comprises a processing means 203 that, particularly, is configured to establish data connections between individual USB connections, i.e., data connections of USB devices connected to the respective USB connections. The processing means 203 may comprise a single-board computer 208, for example, a Raspberry Pi. The multimedia switch box device 200 of the example shown in FIG. 3 may operate similar to the multimedia switch box device 200 shown in FIG. 2.

Moreover, the multimedia switch box device 200 of FIG. 3 comprises a data connection 209 to two further switch boards (not shown in FIG. 3) and another data connection 209' to another further switch board (not shown in FIG. 3). The further switch boards allow for connection of further USB devices to USB connections comprised in the further switch boards thereby resulting in a cascading multimedia switch box device comprising one switch board with a processing means 203 and further switch boards without such a processing means. Each of the USB connections of each of the boards is controlled by the processing means 203.

Figure 4:
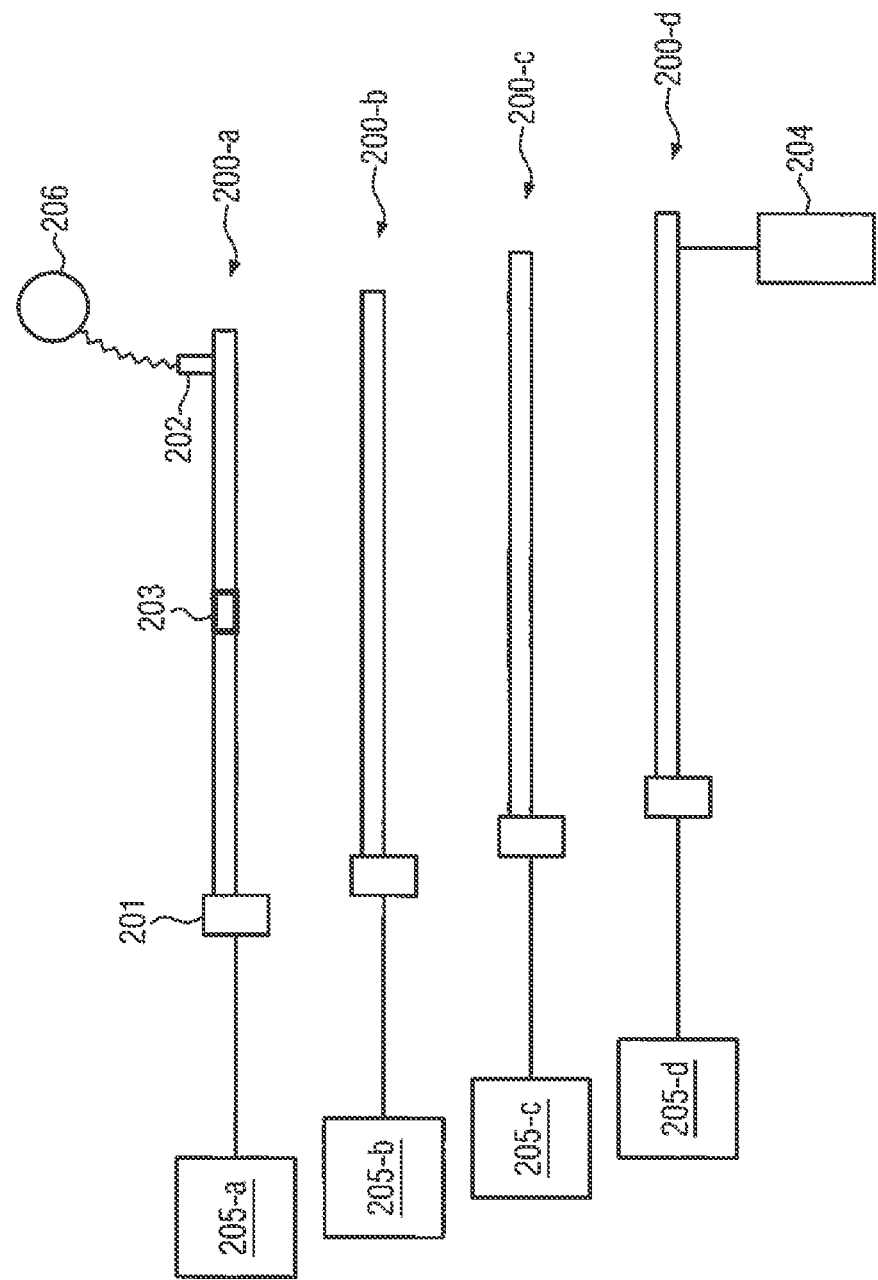
FIG. 4 shows an example of the inventive cascading multimedia switch box device comprising four switch boxes, a processing means comprised in one of the four switch boxes and USB connections.

An example of a cascading multimedia switch box device comprising four multimedia switch boxes 200-a, 200-b, 200-c and 200-d is illustrated in FIG. 4. One of the switch boxes, in the shown example, switch box 200-a, comprises a processing means 203 whereas the other switch boxes (200-b, 200-c, 200-d) do not. Each of the switch boxes 200-a, 200-b, 200-c and 200-d comprises a plurality of USB connections 201, for example, 16 USB connections 201. The individual switch boxes 200-a, 200-b, 200-c and 200-d are in data connection with each other and controlled by the processing means 203.

The switch box 200-a comprising the processing means 203 also comprises an interface 206, for example, comprising an Ethernet, USB, WLAN, WiFi or Bluetooth connection, for detecting an receiving new software 206 made available by a remote server, for example. To each of the switch boxes 200-a, 200-b, 200-c and 200-d a number of USB devices 205-a, 205-b, 205-c and 205-d is connected via the USB connections 201. If new software 206 is detected by the processing means 203 it is downloaded to a USB data storage device 204 that might be connected via one of the USB connections 201 to the switch box 200-d, for example. When some device 205-a, 205-b, 205-c or 205-d, for example, a device under test, is connected via one of the USB connections 201 with one of the switch boxes 200-a, 200-b, 200-c and 200-d for which the software update is made available by the USB data storage device 204 to which the new software has been stored, software update for that device is automatically initiated by the processing means 203. During the software update a one-by-one connection is established between the USB data storage device 204 and the device the software of which has to be updated.

After completion of the software update a test sequence is run by the processing means 202. The test sequence is pre-defined by a user/developer and includes operation of the device with the updated software in interaction with the operation of other USB devices connected with the switch boxes 200-a, 200-b, 200-c and 200-d via the USB connections 201. For example, it can be tested whether a device under test, say 200-a, is able to detect and use media provided by other devices, say 200-b in 200-c, in order to co-operate with them.

Figure 5:
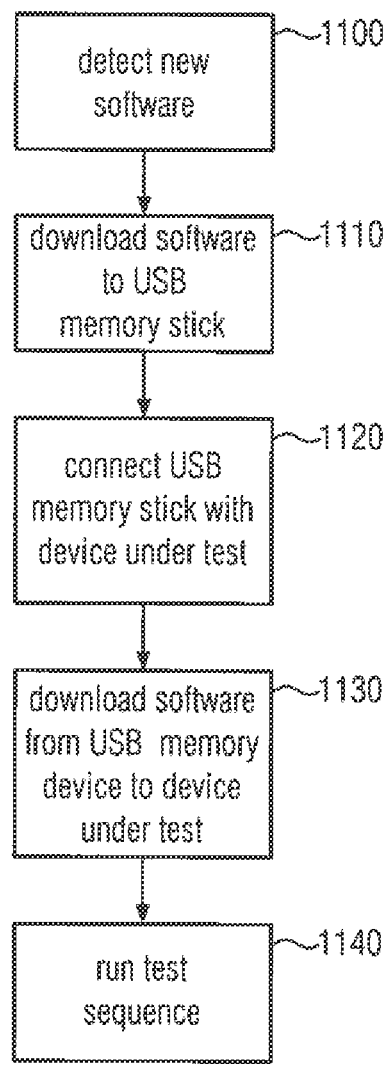
FIG. 5 is a flow chart illustrating an example of the herein disclosed inventive method of updating an electronic device via a multimedia switch box device.

FIG. 5 is a flow chart illustrating the method of updating an electronic device (for example, the device under test 205 shown in FIGS. 2 and 3 or a USB device 205-a, 205-b, 205-c or 205-d shown in FIG. 4. The method makes use of the multimedia switch box device 200 shown in FIGS. 2 and 3 or the cascading multimedia switch box device comprising switch boxes 200-a, 200-b, 200-c and 200-d shown in FIG. 4. In step 1100 newly available software suitable of an electronic device that is to be updated is detected. For example, a remote server may send a signal indicating that new software is available and the signal is received by the processing means of a multimedia switch box device. Upon receipt of the signal (or other means of detecting the new software) the processing means initiates downloading of the software to a USB memory stick 1110 connected with the multimedia switch box device.

When the electronic device, say a device under test, that has to be updated by the software downloaded to the USB memory stick is connected with the multimedia switch box device via a USB connection of the (cascading) multimedia switch box device, one-by-one data connection is established between the USB memory stick and the device under test 1120 and, subsequently, the software is downloaded from the USB memory stick to the device under test 1130. No manual operation of a user/developer is necessary.

After the software has been update on the device under test a test sequence is run 1140. The test sequence may involve operation of the both the device under test and other USB devices connected via USB connections with the (cascading) multimedia switch box device. The test sequence may be started by user/developer or it may be started automatically. For example, the device under test is a DVD player and the test sequence involves testing audio output to a receiver or analog or digital amplifier.

In conclusion, means are provided for automatically updating software on en electronic device connected to a multimedia switch box device without the need for manual operation by a user. A large number of USB devices can be managed by the multimedia switch box device that comprises a processing means for establishing a one-by-one data connection between an the electronic device and a USB memory device on which a newly detected software has been stored by the multimedia switch box device.

All previously discussed embodiments are not intended as limitations but serve as examples illustrating features and advantages of the invention. It is to be understood that some or all of the above described features can also be combined in different ways.

The invention claimed is:

1. A multimedia switch box device, comprising
a processor;
an interface communicatively connected to the processor; and
a plurality of universal serial bus (USB) connections communicatively connected to the processor, wherein the plurality of USB connections comprises a first USB connection for receiving a USB memory device and a second USB connection for receiving a USB device;
wherein the processor is configured to
initiate downloading of software via the interface to the USB memory device connected to the first USB connection;
establish a data connection between the USB memory device and the USB device connected to the second USB connection after downloading the software; and
initiate downloading of the software from the USB memory device to the USB device.

2. The multimedia switch box device of claim 1, wherein the processor is configured to automatically detect the software.

3. The multimedia switch box device of claim 1, wherein the USB device connected to the second USB connection is a device-under-test of an infotainment system, a consumer device, a receiver, or a sat-receiver.

4. The multimedia switch box device of claim 1, wherein the processor is further configured to establish the data connection between the USB memory device and the USB device connected to the second USB connection as a one-by-one data connection.

5. The multimedia switch box device of claim 1, wherein the processor is further configured to automatically execute one or more tests of the USB device connected to the second USB connection after downloading the software to the device.

6. The multimedia switch box device of claim 5, wherein the one or more tests comprises operating an additional USB device connected to a third USB connection one of the plurality of USB connections.

7. The multimedia switch box device of claim 1, wherein the interface comprises an Ethernet, USB, WLAN, WiFi or Bluetooth connection.

8. The multimedia switch box device of claim 1, wherein the plurality of USB connections comprises sixteen USB connections.

9. The multimedia switch box device of claim 1, wherein the data connection comprises a data connection between the first USB connection and the second USB connection.

10. A cascading multimedia switch box device, comprising:
a first multimedia switch box device, that includes:
a processor;
an interface communicatively connected to the processor; and
a plurality of universal serial bus (USB) connections communicatively connected to the processor, wherein the plurality of USB connections comprises a first USB connection for receiving a USB memory device and a second USB connection for receiving a USB device;
wherein the processor is configured to:
initiate downloading of software via the interface to the USB memory device connected to the first USB connection;
establish a data connection between the USB memory device and the USB device connected to the second USB connection after downloading the software; and
initiate downloading of the software from the USB memory device to the USB device; and
a second multimedia switch box that does not include a processor, is connected with the first multimedia switch box device, and includes a plurality of USB connections.

11. The cascading multimedia switch box device of claim 10, further comprising a third multimedia switch box that includes 16 USB connections, but does not include a processor, wherein each of the second, and third multimedia switch boxes is connected in data connection to the first multimedia switch box device.

12. The cascading multimedia switch box device of claim 10, wherein the first multimedia switch box comprises a server.

13. A method of updating an USB electronic device, comprising:
connecting a universal serial bus (USB) memory device to a first USB connection of a multimedia switch box device;
connecting the USB electronic device to a second USB connection of the multimedia switch box device;
automatically downloading software to the USB memory device via an interface;
automatically establishing a data connection between the USB memory device and the USB electronic device after downloading the software; and
automatically downloading the software from the USB memory device to the USB electronic device.

14. The method of claim 13, further comprising automatically detecting the software before downloading the same to the USB memory device.

15. The method according to claim 13, wherein automatically establishing the data connection between the USB memory device and the USB electronic device comprises establishing a one-by-one connection between the USB memory device and the USB electronic device without employing an USB hub.

* * * * *